United States Patent
Sakamoto et al.

(10) Patent No.: US 7,652,733 B2
(45) Date of Patent: Jan. 26, 2010

(54) LIQUID CRYSTAL DISPLAY DEVICE WITH REFLECTOR HAVING ALTERNATING RUGGED PATTERNS

(75) Inventors: Michiaki Sakamoto, Tokyo (JP); Hironori Kikkawa, Tokyo (JP); Kenkichi Harada, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/289,369

(22) Filed: Nov. 7, 2002

(65) Prior Publication Data

US 2003/0103178 A1   Jun. 5, 2003

(30) Foreign Application Priority Data

Nov. 8, 2001   (JP)   ............... 2001-343533

(51) Int. Cl.
*G02F 1/1335* (2006.01)
(52) U.S. Cl. ........................ 349/113; 349/114
(58) Field of Classification Search ................ 349/113, 349/143; 359/585, 850, 857, 859–861
See application file for complete search history.

(56) References Cited

U.S. PATENT DOCUMENTS

| | | | | |
|---|---|---|---|---|
| 5,432,624 | A | * | 7/1995 | Black ........................ 349/73 |
| 5,805,252 | A | * | 9/1998 | Shimada et al. ............ 349/113 |
| 6,163,405 | A | | 12/2000 | Chang et al. |
| 6,747,718 | B2 | * | 6/2004 | Kanou et al. ............... 349/113 |
| 6,784,957 | B2 | * | 8/2004 | Kanou et al. ............... 349/113 |
| 2002/0075432 | A1 | * | 6/2002 | Yamaguchi et al. ......... 349/113 |
| 2004/0070709 | A1 | * | 4/2004 | Kanou et al. ............... 349/113 |

FOREIGN PATENT DOCUMENTS

| | | |
|---|---|---|
| EP | 0884626 | 12/1998 |
| JP | 8-95071 | 4/1996 |
| JP | 2825713 | 9/1998 |
| JP | 11-295750 | 10/1999 |
| JP | 11-337964 | 10/1999 |
| JP | 3012596 | 12/1999 |
| JP | 2001-194662 | 7/2001 |
| JP | 2001-201742 | 7/2001 |
| JP | 2002-258272 | 9/2002 |
| JP | 2002-258278 | 9/2002 |

OTHER PUBLICATIONS

Taiwanese Office Action dated May 31, 2005, with partial English Translation.
Japanese Office Action dated Jan. 12, 2007 with partial English translation.

* cited by examiner

*Primary Examiner*—David Nelms
*Assistant Examiner*—Hoan C Nguyen
(74) *Attorney, Agent, or Firm*—McGinn IP Law Group PLLC

(57) ABSTRACT

There is provided a light-reflector used in a liquid crystal display device which uses an externally incident light as a light source by reflecting the externally incident light to a viewer, wherein the light-reflector is formed at a surface thereof with a rugged pattern comprised of an alternating pattern of pixel pattern areas, each pixel pattern area positioned to overlie a respective one pixel of the liquid crystal display device, each of the pixel pattern areas of the alternating pattern being different, wherein each pixel pattern area of the alternating pattern is comprised of alternately formed recessed and raised portions, and the alternating pattern is formed periodically repeatedly every two pixels.

18 Claims, 15 Drawing Sheets

LIQUID CRYSTAL DISPLAY DEVICE WITH REFLECTOR HAVING ALTERNATING RUGGED PATTERNS

BACKGROUND OF THE INVENTION

1. Field of the Invention

The invention relates to a liquid crystal display device including a light-reflector and the light-reflector, and more particularly to a liquid crystal using an externally incident light as a light source by reflecting the externally incident light to a viewer by means of a light-reflector, and the light-reflector.

2. Description of the Related Art

A liquid crystal display device is grouped into a light-reflection type one, a light-transmission type one and a half-light-transmission type one in accordance with a light source thereof.

A light-transmission type liquid crystal display device includes a light source for transmitting backlight by which an image is displayed.

A light-reflection type liquid crystal display device includes a light-reflector therein, which reflects en externally incident light to a viewer. That is, the light-reflector acts as a light source. Accordingly, unlike a light-transmission type liquid crystal display device, a light-reflection type liquid crystal display device does not need to have a backlight source.

A half-light-transmission type liquid crystal display device is comprised of a combination of the above-mentioned light-transmission and light-reflection type liquid crystal display devices.

A light-reflection type liquid crystal display device consumes smaller power, and can be fabricated thinner and lighter than a light-transmission type liquid crystal display device. This is because it is possible in a light-reflection type liquid crystal display device to use an externally incident light as a light source by reflecting it at a light-reflector, and hence, it is not necessary for a light-transmission type liquid crystal display device to include a backlight source. A light-reflection type liquid crystal display device is widely used as a display device mainly in a terminal device such as a cellular phone.

A presently available light-reflection type liquid crystal display device is comprised of a liquid crystal of a twisted nematic (TN) type, a single polarizer type, a super twisted nematic (STN) type, a guest host (GH) type, a polymer diffusion liquid crystal (PDLC) type, or a cholesteric type, a switching device for driving a liquid crystal, and a light-reflector formed inside or outside a liquid crystal cell. A light-reflection type liquid crystal display device typically includes a thin film transistor (TFT) or a metal/insulator/metal (MIM) diode as a switching device in combination with a light-reflector, and is driven in accordance with an active matrix driving process which can accomplish high fineness and high image quality.

For instance, Japanese Patents Nos. 2825713 (B2) and 3012596 (B2) suggest a light-reflection type liquid crystal display device.

In the suggested light-reflection type liquid crystal display device, a light-reflector is formed at a surface thereof with a rugged pattern by the steps of forming an organic insulating film on the light-reflector, patterning the organic insulating film by photolithography and etching to thereby form isolated raised portions, forming an interlayer insulating film on the raised portions to thereby form a smooth rugged pattern having mountain portions comprised of the raised portions and valley portions comprised of portions other than the mountain portions.

FIG. 1 is a plan view illustrating an example of a rugged pattern formed on a conventional light-reflector.

As illustrated in FIG. 1, the illustrated rugged pattern has a plurality of raised portions 2 each having a circular cross-section, formed at a surface of the light-reflector 1. The raised portions 2 are formed isolated from one another.

The conventional light-reflector 1 has a purpose of scattering an incident light to some degree, and then, reflecting the scattered incident light. Hence, the scattered incident light is reflected almost uniformly such that the reflected light forms a cone.

FIG. 2 illustrates a relation between an incident light Li and a light Lr reflected at the light-reflector illustrated in FIG. 1.

As illustrated in FIG. 2, an incident light Li (for instance, a light emitted from a fluorescent lamp or a sunlight) entering a light-reflection type liquid crystal display device in a direction in which a viewer watches a display screen of the light-reflection type liquid crystal display device is reflected at the light-reflector 1, and is diffused almost uniformly in every direction as a reflected light Lr.

The light-reflector 1 having a rugged pattern comprised of the raised portions 2 each having a circular cross-section generally receives an intensive direct light in a particular direction such as a light emitted from a fluorescent lamp in a room. The light-reflector 1 cannot efficiently reflect a light entering in a particular direction, towards a viewer in an atmosphere in which the light-reflector 1 receives a weak indirect light having been reflected from a wall, and hence, a light-reflection type liquid crystal display device including the light-reflector 1 cannot make efficient use of an incident light entering the light-reflector 1. Accordingly, just a weak light is reflected to a viewer, and thus, the viewer feels that a display screen of a light-reflection type liquid crystal display device including the light-reflector 1 is dark.

In dependence on a shape of a rugged pattern formed at a surface of the light-reflector 1, lengths of paths along which lights run are different from one another in accordance with a location at which the light is reflected in the rugged pattern As a result, a tone would be remarkably varied due to interference caused by a difference among the above-mentioned lengths of paths, in dependence on an angle formed among a viewer, the light-reflector, and an incident light. This deteriorates display performance of a color liquid crystal display device.

In order to solve such a problem as mentioned above, the assignee of the present invention has suggested a light-reflector and a light-reflection type liquid crystal display device including the same in Japanese Unexamined Patent Publication 2002-258272 (A) published on Sep. 11, 2002. The suggested light-reflector can efficiently reflect a light towards a viewer.

The suggested light-reflector and light-reflection type liquid crystal display device including the same are explained hereinbelow. However, it should be noted that the explanation made hereinbelow does not mean that the applicant admits Japanese Unexamined Patent Publication 2002-258272 (A) as statutory prior art to the present invention. The Publication is explained only for the purpose of better understanding of the present invention.

FIG. 3 is a partial cross-sectional view of the suggested light-reflection type liquid crystal display device 10.

The suggested light-reflection type liquid crystal display device 10 is comprised of a lower substrate 11, an opposing substrate 12 arranged in opposing relation with the lower substrate 11, and a liquid crystal layer 13 sandwiched between the lower substrate 11 and the opposing substrate 12.

The light-reflection type liquid crystal display device 10 is of an active matrix type, and hence, includes thin film transistors (TFTs) in each of pixels as a switching device.

The lower substrate 11 is comprised of an electrically insulating substrate 14, an electrically insulating protection film 15, a thin film transistor 16, a first electrically insulating layer 17, raised portions 18, a second electrically insulating layer 19, and a reflection electrode 20.

The electrically insulating protection film 15 is formed on the electrically insulating substrate 14, and the thin film transistor 16 is formed on the electrically insulating protection film 15. The thin film transistor 16 is comprised of a gate electrode 16a formed on the electrically insulating substrate 14, a semiconductor layer 16c formed on the electrically insulating protection film 15, covering the gate electrode 16a therewith, a drain electrode 16b formed on the electrically insulating protection film 15, making electrical contact with the semiconductor layer 16c, and a source electrode 16d formed on the electrically insulating protection film 15, making electrical contact with the semiconductor layer 16c.

The first electrically insulating layer 17 is formed covering the semiconductor layer 16c, the drain electrode 16b and the source electrode 16d therewith. The raised portions 18 are formed on the first electrically insulating layer 17 and the source electrode 16d. The second electrically insulating layer 19 covers the raised portions 18, the first electrically insulating layer 17 and the source electrode 16d therewith, and is formed with a contact hole 21 therethrough which reaches the source electrode 16d.

The reflection electrode 20 is formed covering the contact hole 21 and the second electrically insulating layer 19 therewith. The reflection electrode 20 is electrically connected to the source electrode 16d of the thin film transistor 16, and acts as a light-reflector and a pixel electrode.

In a terminal region defined as a marginal region of the lower substrate 11, a gate terminal 22 is formed on the electrically insulating substrate 14, and a drain terminal 23 is formed on the electrically insulating protection film 15 partially covering the gate terminal 22 therewith.

The opposing substrate 12 is comprised of an electrically insulating substrate 26, a color filter 25 formed on the electrically insulating substrate 26, and a transparent electrode 24 formed on the color filter 25. The color filter 24 and the transparent electrode 24 face the liquid crystal layer 13.

The incident light Li entering the light-reflection type liquid crystal display device 10 through the electrically insulating substrate 26 reaches the lower substrate 11 through the liquid crystal layer 13, and then, is reflected at the reflection electrode 20 as the reflected light Lr. Then, the reflected light Lr is emitted out of the light-reflection type liquid crystal display device 10 through the liquid crystal layer 18 and the opposing substrate 12.

FIG. 4A illustrates the incident light Li directing to the light-reflector 1, and the reflected light Lr reflected at the light-reflector 1 and caught by a viewer.

Herein, an incident angle Ti is defined as an angle formed between the incident light L and a normal line of the light-reflector 1, and a reflection angle Tr is defined as an angle formed between the reflected light Lr and the normal line of the light-reflector 1. Since the incident light Li is reflected at the reflection electrode 20 formed in a rugged pattern by the raised portions 18 and the second electrically insulating layer 19, the incident angle Ti and the reflection angle Tr are different from each other.

FIG. 4B illustrates how a light reaching a point A of the reflection electrode 20 is reflected. For simplification, only a surface of the reflection electrode 20 and the light-reflector 1 are illustrated in FIG. 4B.

The incident light Li reaching the point A of the reflection electrode 20 having a rugged pattern is reflected at a tangential plane at the point A, and hence, the incident light Li is reflected in a direction symmetrical about a normal line of the light-reflector 20 at the point A.

Assuming that an inclination angle point A is defined as an angle formed between a tangential plane of the reflection electrode 20 at the point A and the light-reflector 1, a profile of the reflected light Lr is dependent on a profile of the inclination angles θ of a rugged pattern of the reflection electrode 20. Accordingly, since a viewer P subjectively evaluates a brightness of the light-reflector 1, it is important to design a profile of the inclination angles θ such that a viewer P feels that a display screen is bright.

Analyzing how a light-reflection type liquid crystal display device is used by a user, it is understood that, in almost all cases, a viewer P catches the reflected light Lr in such manners as illustrated in FIGS. 5A and 5B. In FIG. 5A, the incident light Li emitted from a light source S located at an angle between 0 to −60 degrees from a normal line of the light-reflector 1 is reflected in a direction angled from the normal line of the light-reflector 1 between −10 and 20 degrees. In FIG. 5B, the incident light Li coming in a direction angled between −20 and 20 degrees about the point A of the light-reflector 1 is reflected in a direction angled between −20 and 20 degrees about the point A of the light-reflector 1.

By designing a rugged pattern of the light-reflector 1 to have raised and recessed portions extending horizontally as viewed from a viewer, it would be possible to design the light-reflector 1 to have such a directivity that the incident lights Li emitted from the light source S are efficiently reflected to the viewer P as the reflected lights Lr.

FIG. 6 is a plan view of a rugged pattern formed at a surface of the light-reflector 1.

In FIG. 6, a hatched area indicates an area in which the raised portions 18 are formed, and hollow triangles indicate areas in each of which a recessed portion is formed. Though the hollow triangles indicating a recessed portion are arranged regularly, the triangles are actually arranged irregularly to a degree.

In FIG. 6, the raised portions 18 define three sides of each of the triangles. As an alternative, a plurality of linear raised patterns may define a closed shape such as a rectangle or an ellipse.

FIG. 7 is a cross-sectional view of the rugged pattern illustrated in FIG. 6.

In FIG. 7, L indicates a distance between centers of the adjacent raised patterns 18, W indicates a width of the raised pattern 18, D indicates a height of the raised pattern 18, d indicates a minimum height of the second electrically insulating layer 19, and ΔD indicates a difference between a maximum height of the second electrically insulating layer 19 and a minimum height of the second electrically insulating layer 19. Since the reflection electrode 20 comprised of an aluminum film coated on the second electrically insulating layer 19 is extremely thin, a thickness of the reflection electrode 20 is ignorable, and hence, is not illustrated in FIG. 7.

FIG. 6 illustrates the raised pattern 18 associated with a pixel.

In the above-mentioned conventional light-reflection type liquid crystal display device 10, the raised pattern 18 is uniquely determined in association with a pixel, and when a plurality of pixels are arranged, the thus determined raised pattern 18 is repeatedly arranged.

For instance, when three pixels 30*a*, 30*b* and 30*c* are successively arranged, as illustrated in FIG. 8, the raised pattern 18 illustrated in FIG. 6 is repeatedly arranged in association with every pixel 30*a*, 30*b* and 30*c*.

In these days, a liquid crystal display device is required to have high fineness. In order to accomplish high fineness in a liquid crystal display device, a pitch of repetition of the raised patterns 18, that is, a width of a pixel has to be as small as possible. If a pixel is designed to have a smaller width, a width includes the smaller number of triangles or recessed portions.

When a liquid crystal display device is used for displaying a Black and white image in a portable device such as a cellular phone, the liquid crystal display device is generally designed as a light-reflection type one.

However, if a liquid crystal display device is used for displaying color images in a portable device, a light-reflection type liquid crystal display device is accompanied with a problem of shortage in a brightness. Hence, in these days, a liquid crystal display device used for displaying color images is designed as a half-light-transmission type one including a first area in which an incident light is reflected and a second area in which a back light transmits therethrough, in a single pixel in order to compensate for shortage of brightness. Such a half-light-transmission type liquid crystal display device includes a backlight source for the second area, and hence, makes it possible to display bright images even in dark atmosphere.

FIG. 9 is a plan view of a half-light-transmission type liquid crystal display device.

Similarly to the light-reflection type liquid crystal display device illustrated in FIG. 8, the illustrated half-light-transmission type liquid crystal display device includes three pixels 300*a*, 300*b* and 300*c*. Each of the pixels 300*a*, 300*b* and 300*c* is designed to have a light-reflection area 301*a*, 301*b* and 301*c* in which a light-reflector is formed, and a light-transmission area 302*a*, 302*b* and 302*c* in which a light passes therethrough, respectively. Each of the light-reflection area 301*a*, 801*b* and 301*c* occupies about one-third in an area of the pixels 300*a*, 300*b* and 300*c*, and each of the light-transmission area 302*a*, 302*b* and 302*c* occupies two-thirds in an area of the pixels 300*a*, 300*b* and 300*c*.

A rate of a light-reflection area and a light-transmission area in a pixel is dependent on a device to be used, but, an area occupied by a light-reflector in a pixel in a half-light-transmission type liquid crystal display device is smaller than an area occupied by a light-reflector in a pixel in a light-reflection type liquid crystal display device. Accordingly, the number of triangles or recessed portions included in a pixel in a half-light-transmission type liquid crystal display device is smaller than the same in a light-reflection type liquid crystal display device.

An area of a triangle or a recessed portion is dependent on a capacity of an apparatus for fabricating a liquid crystal display device, such as an accuracy with which a photoresist is exposed to a light, and hence, an area of a triangle or a recessed portion cannot be formed too small.

As mentioned above, reduction in the number of triangles or recessed portions to be included in a pixel, due to requirement to high fineness and tendency of fabrication of a liquid crystal display device as a half-light-transmission type one, causes a problem of interference of the reflected lights Lr with each other (see FIG. 2). This is because if the number of triangles or recessed portions included in a pixel is reduced, it would be difficult to cancel interference of the reflected lights with each other in a pixel.

A light-reflector is generally designed to have a pattern of repeating a pixel, and hence, if it is not possible to cancel interference of the reflected lights with each other in a pixel, it would not be possible to cancel interference of the reflected lights with each other also in a plurality of pixels. Interference of the reflected lights Lr with each other would degrade display performance of a liquid crystal display device.

SUMMARY OF THE INVENTION

In view of the above-mentioned problem in the conventional liquid crystal display device, it is an object of the present invention to provide a light-reflector which has a small area in association with a pixel, but can prevent interference of reflected lights with each other.

In one aspect of the present invention, there is provided a light-reflector used in a liquid crystal display device which uses an externally incident light as a light source by reflecting the externally incident light to a viewer, wherein the light-reflector is formed at a surface thereof with a rugged pattern comprised of alternately formed recessed and raised portions, and the rugged pattern is formed periodically repeatedly every two pixels.

The light-reflector in accordance with the present invention is designed to have a rugged pattern repeatedly arranged over a plurality of pixels. Accordingly, unlike a conventional liquid crystal display device in which the same rugged pattern is repeatedly formed in every pixel, it would be possible to set a greater and desired pitch of repetition of a rugged pattern. As a result, the light-reflector in accordance with the present invention can prevent interference of reflected lights with each other.

For instance, it is preferable that a pitch of repetition of the rugged pattern is equal to or smaller than 0.5 mm.

For instance, the raised portion may be comprised of a plurality of linear shapes, and the recessed portion is surrounded by the raised portion to define a closed shape.

For instance, the closed shape is a triangle.

It is preferable that the rugged pattern is formed successively over at least two pixels.

There is further provided a light-reflector used in a liquid crystal display device which uses an externally incident light as a light source by reflecting the externally incident light to a viewer, wherein the light-reflector is formed at a surface thereof with a rugged pattern comprised of alternately formed recessed and raised portions, the rugged pattern is formed periodically repeatedly every two pixels, and a cycle of repetition of the rugged pattern is equal to N wherein N is a positive integer other than three (3).

For instance, the cycle may be set equal to two.

There is still further provided a light-reflector used in a liquid crystal display device which uses an externally incident light as a light source by reflecting the externally incident light to a viewer, the liquid crystal display device including a plurality of pixels in each of which the light-reflector is formed, wherein N pixels are formed periodically and repeatedly in a first direction wherein N is an integer equal to or greater than two, the N pixels having N colors different from one another, M pixels are formed periodically and repeatedly in the first direction wherein M is an integer equal to or greater than two, each of the M pixels having a light-reflector having M rugged patterns, and pixels arranged in the first direction by a least common multiple (LCM) of the N and the M have a length equal to or smaller than 0.5 mm.

A liquid crystal display device may be designed to include the above-mentioned light-reflector to thereby using an externally incident light as a light source by reflecting the externally incident light to a viewer. Herein, the term "a liquid crystal display device" includes a light-reflection type one and a half-light-transmission type one.

The advantages obtained by the aforementioned present invention will be described hereinbelow.

The light-reflector in accordance with the present invention is designed to have a rugged pattern repeatedly arranged over a plurality of pixels. Accordingly, unlike a conventional liquid crystal display device in which the same rugged pattern is repeatedly formed in every pixel, it would be possible to set a greater and desired pitch of repetition of a rugged pattern. As a result, the light-reflector can prevent interference of reflected lights with each other, and hence, generation of a stripped pattern at a surface of a display screen of a liquid crystal display device.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 10:
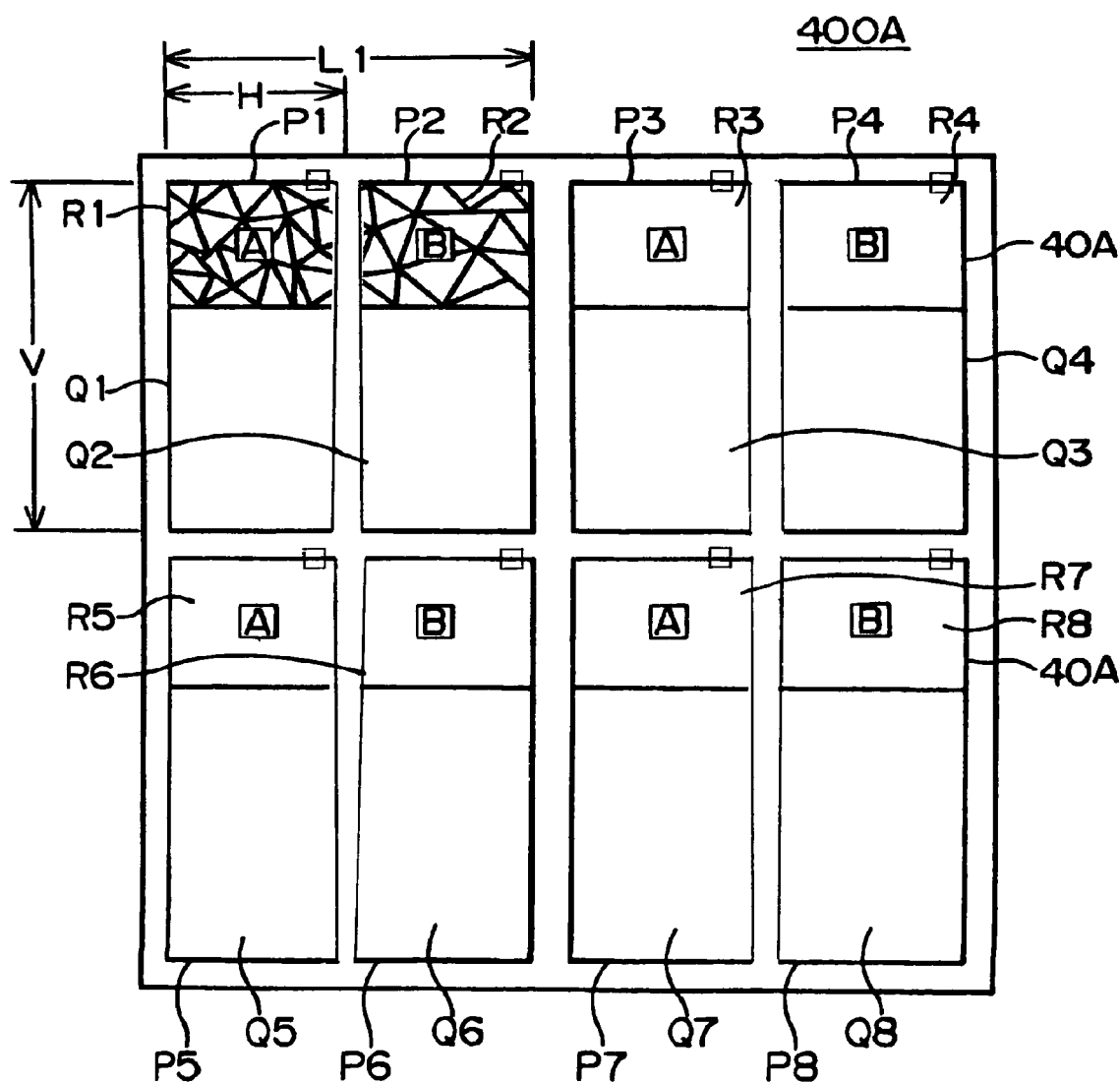
FIG. 10 is a plan view of a light-reflector and a half-light-transmission type liquid crystal display device including the light-reflector, in accordance with the first embodiment of the present invention.

FIG. 10 is a plan view of a light-reflector 40A and a half-light-transmission type liquid crystal display device 400A including the light-reflector 40A, in accordance with the first embodiment.

The half-light-transmission type liquid crystal display device 400A includes vertically two rows and horizontally four rows of pixels. That is, the liquid crystal display device 400A includes totally eight pixels each having a width H and a height V. Among the eight pixels, pixels P1, P2, P3 and P4 are located at an upper row, and pixels P5, P6, P7 and P8 are located at a lower row. The pixels P1 to P8 include light-reflection areas R1 to R8 and light-transmission areas Q1 to Q8, respectively. In each of the light-reflection areas R1 to R8, there is formed a light-reflector 40A.

Figure 6:
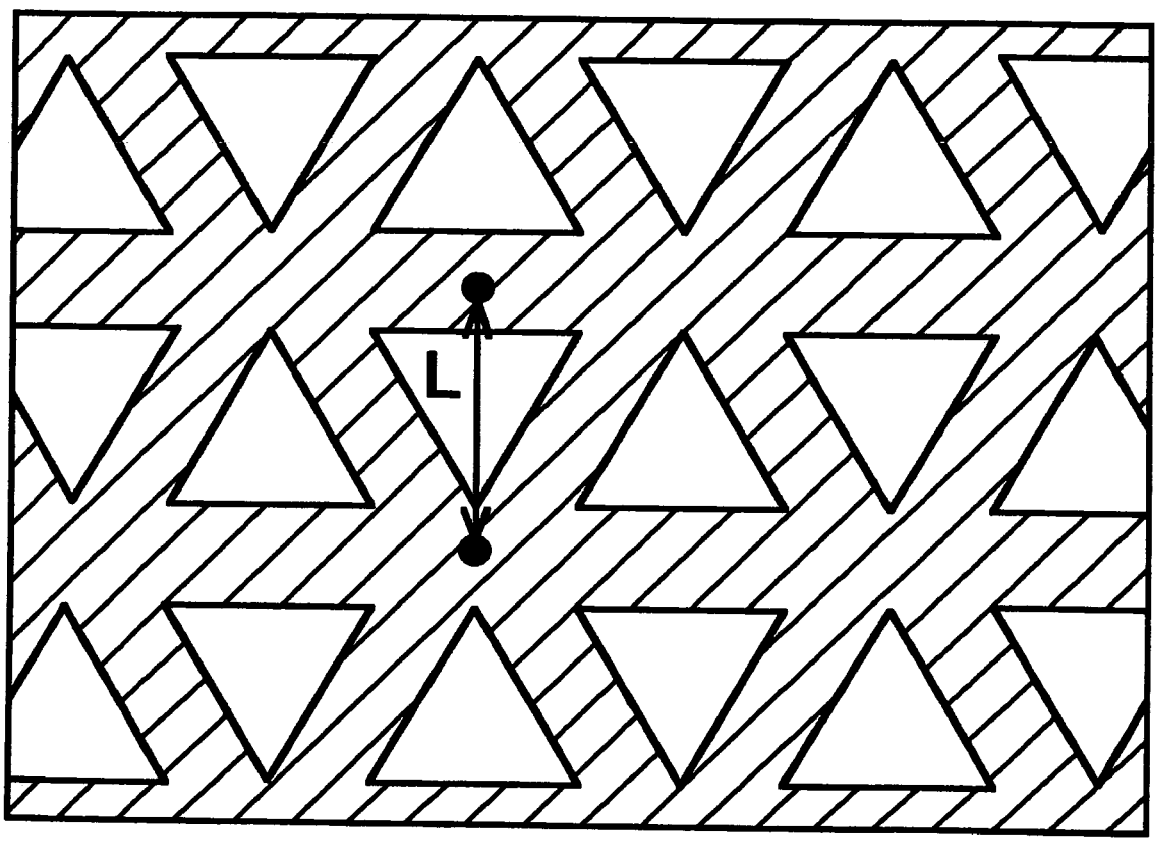
FIG. 6 is a plan view of a rugged pattern formed at a surface of a conventional light-reflector.
Figure 7:
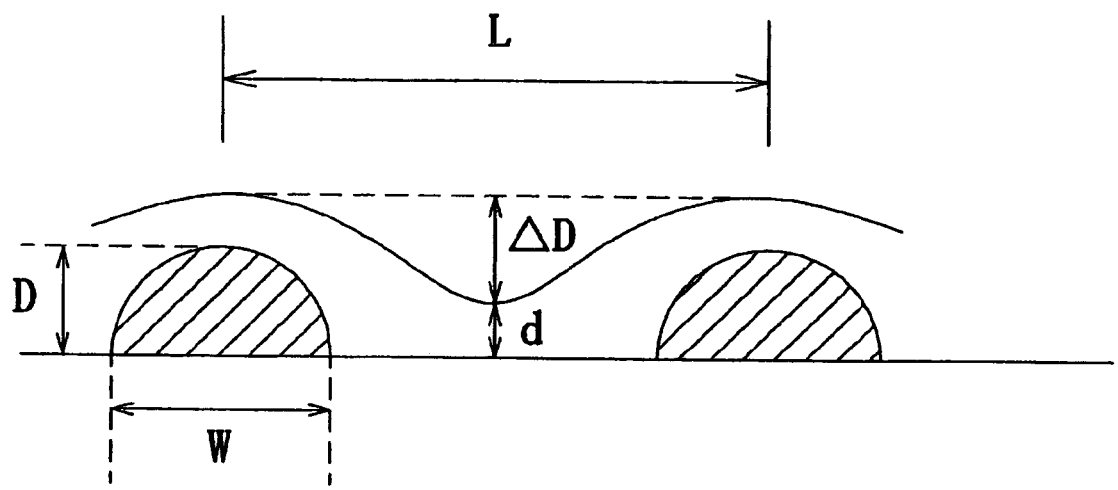
FIG. 7 is a cross-sectional view of the rugged pattern illustrated in FIG. 6.
Figure 8:
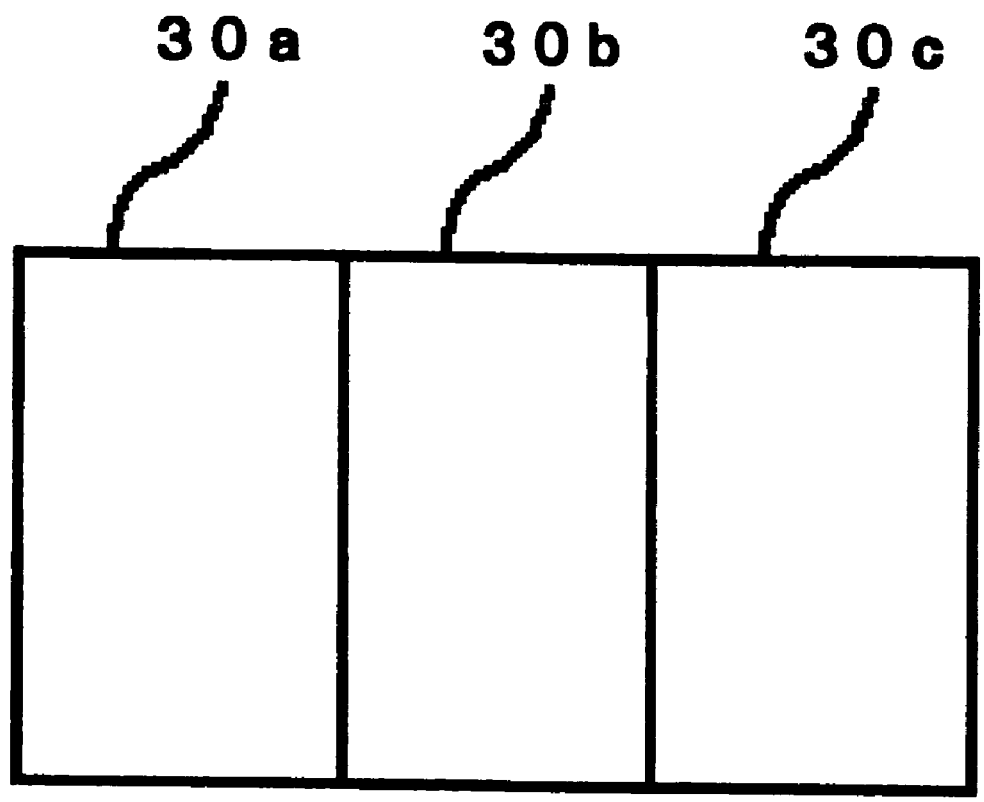
FIG. 8 is a plan view illustrating arrangement of a plurality of light-reflectors in a light-reflection type liquid crystal display device.
Figure 9:
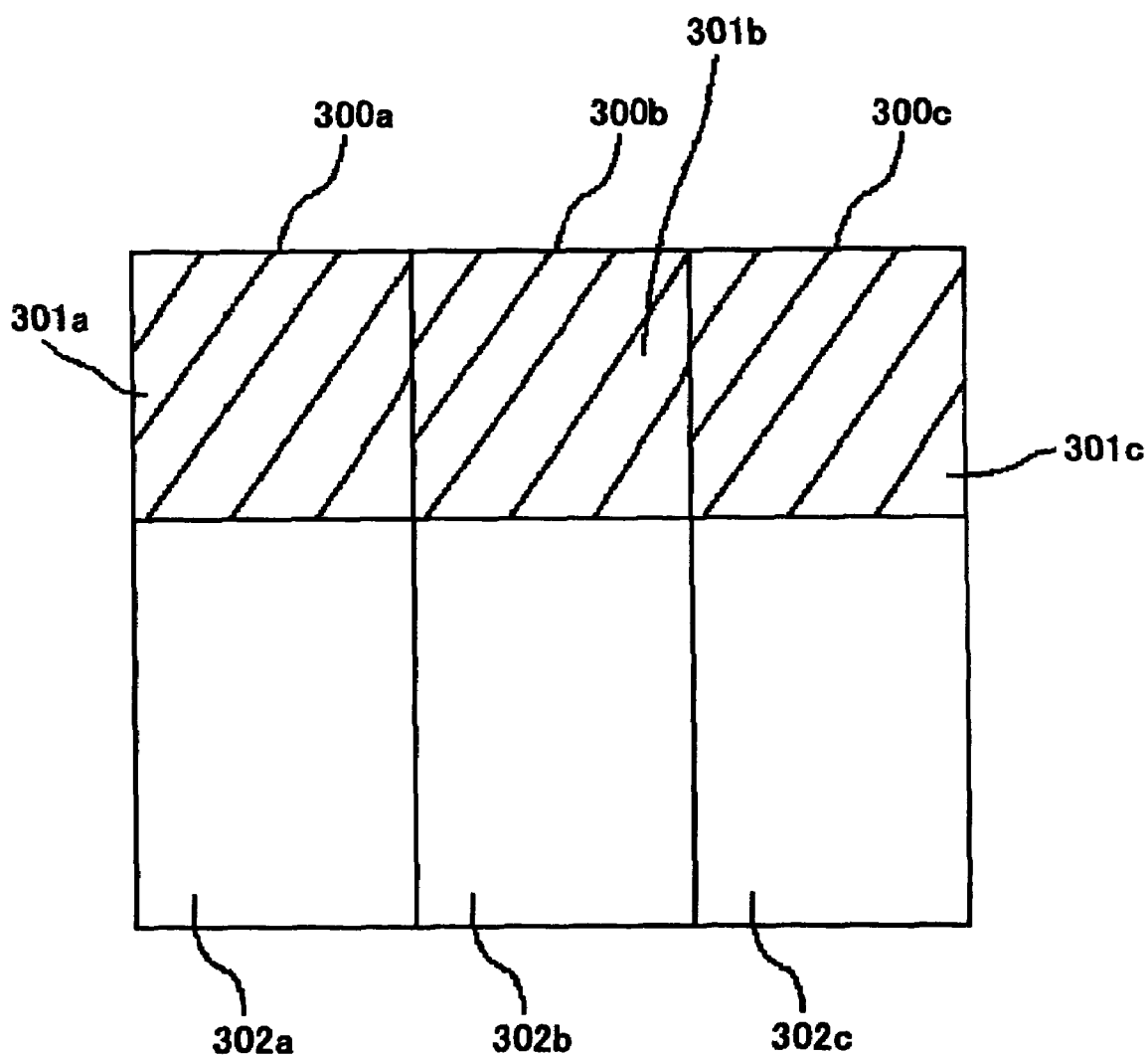
FIG. 9 is a plan view illustrating arrangement of a plurality of light-reflectors in a half-light-transmission type liquid crystal display device.

The light-reflector 40A illustrated in FIG. 10 is formed at a surface thereof with a rugged pattern, similarly to the light-reflector 1 illustrated in FIG. 6. Specifically, the rugged pattern is comprised of raised linear patterns extending in random directions, and recessed patterns surrounded by the raised linear patterns and defining a triangle are formed at a surface of the light-reflector 40A.

In light-reflector 40A, a first type rugged pattern A is formed in the pixel P1 located at the upper row, and a second type rugged pattern B is formed in the pixel P2 located adjacent to the pixel P1. In addition, these first type rugged pattern A and second type rugged pattern B are successively formed.

The first type rugged pattern A is formed in the pixel P3 located adjacent to the pixel P2, and the second type rugged pattern B is formed in the pixel P4 located adjacent to the pixel P3. In addition, these first type rugged pattern A and second type rugged pattern B are successively formed.

Similarly, the first type rugged pattern A is formed in the pixel P5 located at the lower row, and the second type rugged pattern B is formed in the pixel P6 located adjacent to the pixel P5. In addition, these first type rugged pattern A and second type rugged pattern B are successively formed.

The first type rugged pattern A is formed in the pixel P7 located adjacent to the pixel P6, and the second type rugged pattern B is formed in the pixel P8 located adjacent to the pixel P7. In addition, these first type rugged pattern A and second type rugged pattern B are successively formed.

As mentioned above, the light-reflector 40A used in the half-light-transmission type liquid crystal display device 400A in accordance with the first embodiment is designed to have the same rugged pattern repeatedly formed every adjacent two pixels. Specifically, a combination of the rugged patterns A and B is formed every two pixels, and the rugged patterns A and B are successive to each other.

By merely repeatedly forming a combination of the rugged patterns A and B, it would be possible to cancel interference of reflected lights with each other, in the two pixels. For instance, repetition of a combination of the rugged patterns A and B makes it easier to cancel interference of reflected lights with each other than repetition only of the rugged pattern A or B. In addition, successive formation of the rugged patterns A and B would make it further easier to cancel of interference of reflected lights with each other.

Second Embodiment

Figure 11:
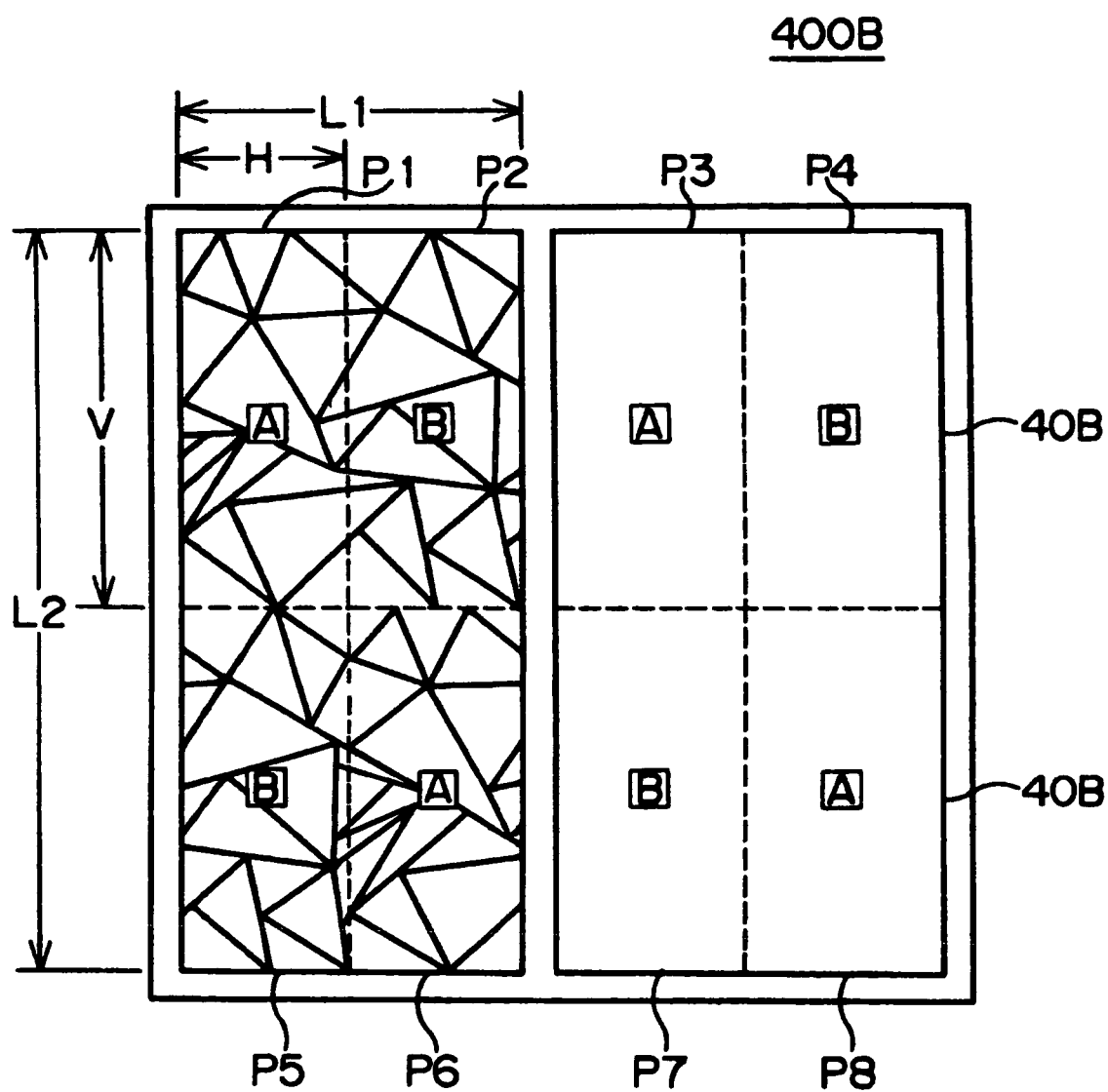
FIG. 11 is a plan view of a light-reflector and a light-reflection type liquid crystal display device including the light-reflector, in accordance with the second embodiment of the present invention.

FIG. 11 is a plan view of a light-reflector 40B and a light-reflection type liquid crystal display device 400B including the light-reflector 40B, in accordance with the second embodiment.

Similarly to the half-light-transmission type liquid crystal display device 400A in accordance with the first embodiment, the light-reflection type liquid crystal display device 400B includes vertically two rows and horizontally four rows of pixels. That is, the liquid crystal display device 400B includes totally eight pixels each having a width H and a height V. Among the eight pixels, pixels P1, P2, P3 and P4 are located at an upper row, and pixels P5, P6, P7 and P8 are located at a lower row. The light-reflection type liquid crystal display device 400B includes only light-reflection areas in each of which there is formed a light-reflector 40B.

Similarly to the light-reflector 40A, the light-reflector 40B illustrated in FIG. 11 is formed at a surface thereof with a rugged pattern, Specifically, the rugged pattern is comprised of raised linear patterns extending in random directions, and recessed patterns surrounded by the raised linear patterns and defining a triangle are formed at a surface of the light-reflector 40B.

In light-reflector 40B, a first type rugged pattern A is formed in the pixel P1 located at the upper row, and a second type rugged pattern B is formed in the pixel P2 located adjacent to the pixel P1. In addition, these first type rugged pattern A and second type rugged pattern B are successively formed.

The first type rugged pattern A is formed in the pixel P3 located adjacent to the pixel P2, and the second type rugged pattern B is formed in the pixel P4 located adjacent to the pixel P3. In addition, these first type rugged pattern A and second type rugged pattern B are successively formed.

Similarly, the second type rugged pattern B is formed in the pixel P5 located at the lower row, and the first type rugged pattern A is formed in the pixel P6 located adjacent to the pixel P5. In addition, these second type rugged pattern B and first type rugged pattern A are successively formed.

The second type rugged pattern B is formed in the pixel P7 located adjacent to the pixel P6, and the first type rugged pattern A is formed in the pixel P8 located adjacent to the pixel P7. In addition, these second type rugged pattern B and first type rugged pattern A are successively formed.

In addition, the first type rugged pattern A in the pixel P1 and the second type rugged pattern B in the pixel P5 are successively formed.

Similarly, the second type rugged pattern B in the pixel P2 and the first type rugged pattern A in the pixel P6 are successively formed. The first type rugged pattern A in the pixel P3 and the second type rugged pattern B in the pixel P7 are successively formed. The second type rugged pattern B in the pixel P4 and the first type rugged pattern A in the pixel P8 are successively formed.

In the light-reflector 40A used in the half-light-transmission type liquid crystal display device 400A in accordance with the first embodiment, the same rugged pattern is repeatedly formed only in a single direction, specifically, horizontally, every two pixels located adjacent to each other. In contrast, in the light-reflector 40B in the second embodiment, the same rugged pattern A+B or B+A is repeatedly formed in two directions, specifically, both horizontally and vertically, every two pixels located adjacent to each other.

Third Embodiment

Figure 12:
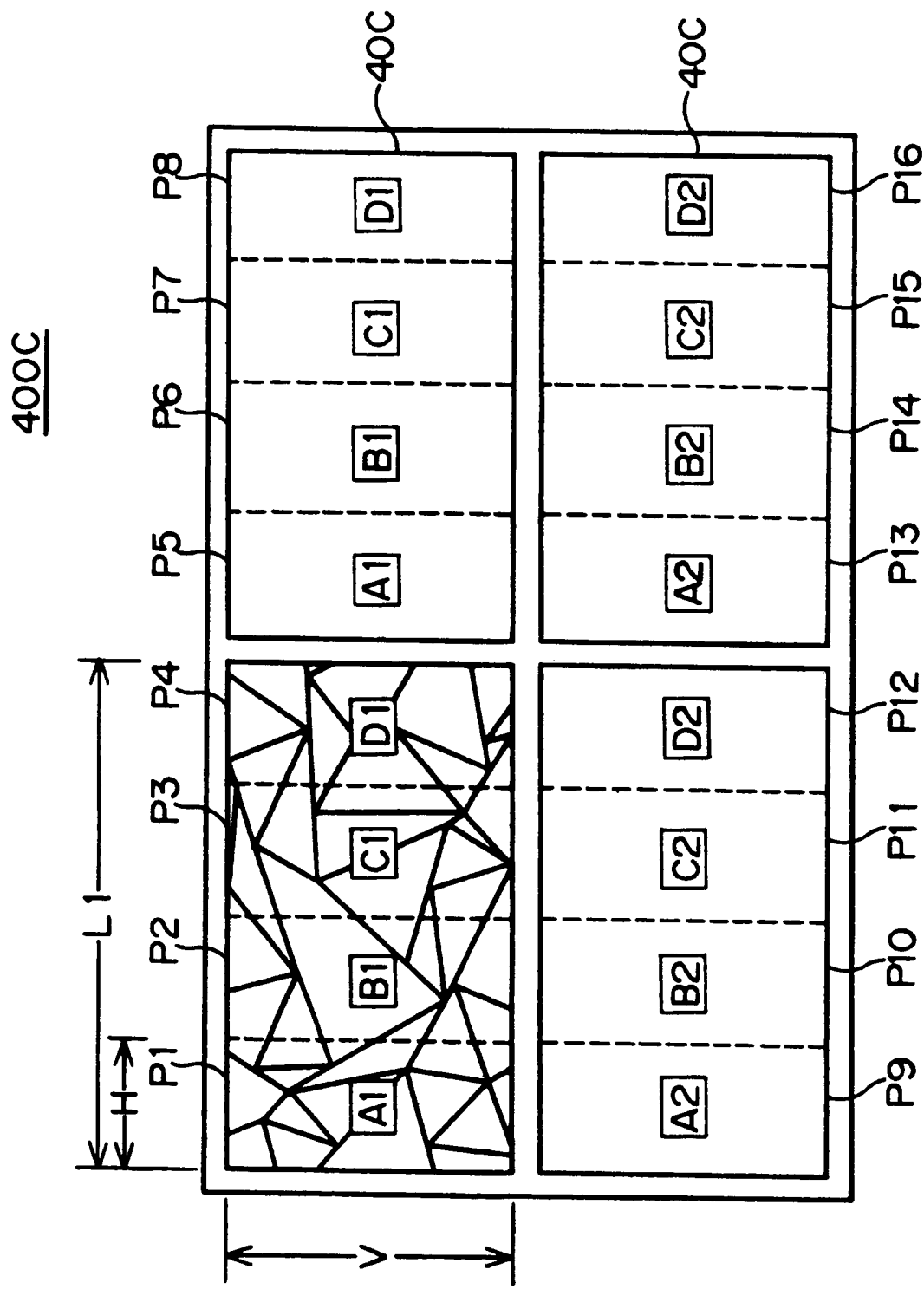
FIG. 12 is a plan view of a light-reflector and a light-reflection type liquid crystal display device including the light-reflector, in accordance with the third embodiment of the present invention.

FIG. 12 is a plan view of a light-reflector 40C and a light-reflection type liquid crystal display device 400C including the light-reflector 40C, in accordance with the third embodiment.

The light-reflection type liquid crystal display device 400C includes vertically two rows and horizontally eight rows of pixels. That is, the liquid crystal display device 400C includes totally sixteen pixels each having a width H and a height V. Among the sixteen pixels, pixels P1, P2, P3, P4, P5, P6, P7 and P8 are located at an upper row, and pixels P9, P10, P11, P12, P13, P14, P15 and P16 are located at a lower row. The light-reflection type liquid crystal display device 400C includes only light-reflection areas in each of which there is formed a light-reflector 40C.

Similarly to the light-reflector 40A in the first embodiment, the light-reflector 40C illustrated in FIG. 12 is formed at a surface thereof with a rugged pattern. Specifically, the rugged pattern is comprised of raised linear patterns extending in random directions, and recessed patterns surrounded by the raised linear patterns and defining a triangle are formed at a surface of the light-reflector 40C.

In light-reflector 40C, a first type rugged pattern A1 is formed in the pixel P1 located at the upper row, a second type rugged pattern B1 is formed in the pixel P2 located adjacent to the pixel P1, a third type rugged pattern C1 is formed in the pixel P3 located adjacent to the pixel P2, and a fourth type rugged pattern D1 is formed in the pixel P4 located adjacent to the pixel P3. In addition, these first to fourth type rugged patterns A1, B1, C1 and D1 are successively formed.

The first type rugged pattern A1 is formed in the pixel P5 located adjacent to the pixel P4, the second type rugged pattern B1 is formed in the pixel P6 located adjacent to the pixel P5, the third type rugged pattern C1 is formed in the pixel P7 located adjacent to the pixel P6, and the fourth type rugged pattern D1 is formed in the pixel P8 located adjacent to the pixel P7. In addition, these first to fourth type rugged patterns A1, B1, C1 and D1 are successively formed.

Similarly, a fifth type rugged pattern A2 is formed in the pixel P9 located at the lower row, a sixth type rugged pattern B2 is formed in the pixel P10 located adjacent to the pixel P9, a seventh type rugged pattern C2 is formed in the pixel P11 located adjacent to the pixel P10, and an eighth type rugged pattern D2 is formed in the pixel P12 located adjacent to the pixel P11. In addition, these fifth to eighth type rugged patterns A2, B2, C2 and D2 are successively formed.

The fifth type rugged pattern A2 is formed in the pixel P13 located adjacent to the pixel P12, the sixth type rugged pattern B2 is formed in the pixel P14 located adjacent to the pixel P13, the seventh type rugged pattern C2 is formed in the pixel P15 located adjacent to the pixel P14, and the eighth type rugged pattern D2 is formed in the pixel P16 located adjacent to the pixel P15. In addition, these fifth to eighth type rugged patterns A2, B2, C2 and D2 are successively formed.

In the light-reflector 40C used in the light-reflection type liquid crystal display device 400C in accordance with the third embodiment, the same rugged pattern is repeatedly formed in the upper row every four pixels located in series. Specifically, the rugged pattern (A1+B1+C1+D1) is repeatedly formed every four pixels located in series.

Similarly, the same rugged pattern is repeatedly formed in the lower row every four pixels located in series. Specifically, the rugged pattern (A2+B2+C2+D2) is repeatedly formed every four pixels located in series.

The first to fourth type rugged patterns A1, B1, C1 and D1 may be formed in the lower pixels P9, P10, P11 and P12 and/or P13, P14, P15 and P16, similarly to the upper pixels P1 to P8.

Fourth Embodiment

Figure 13:
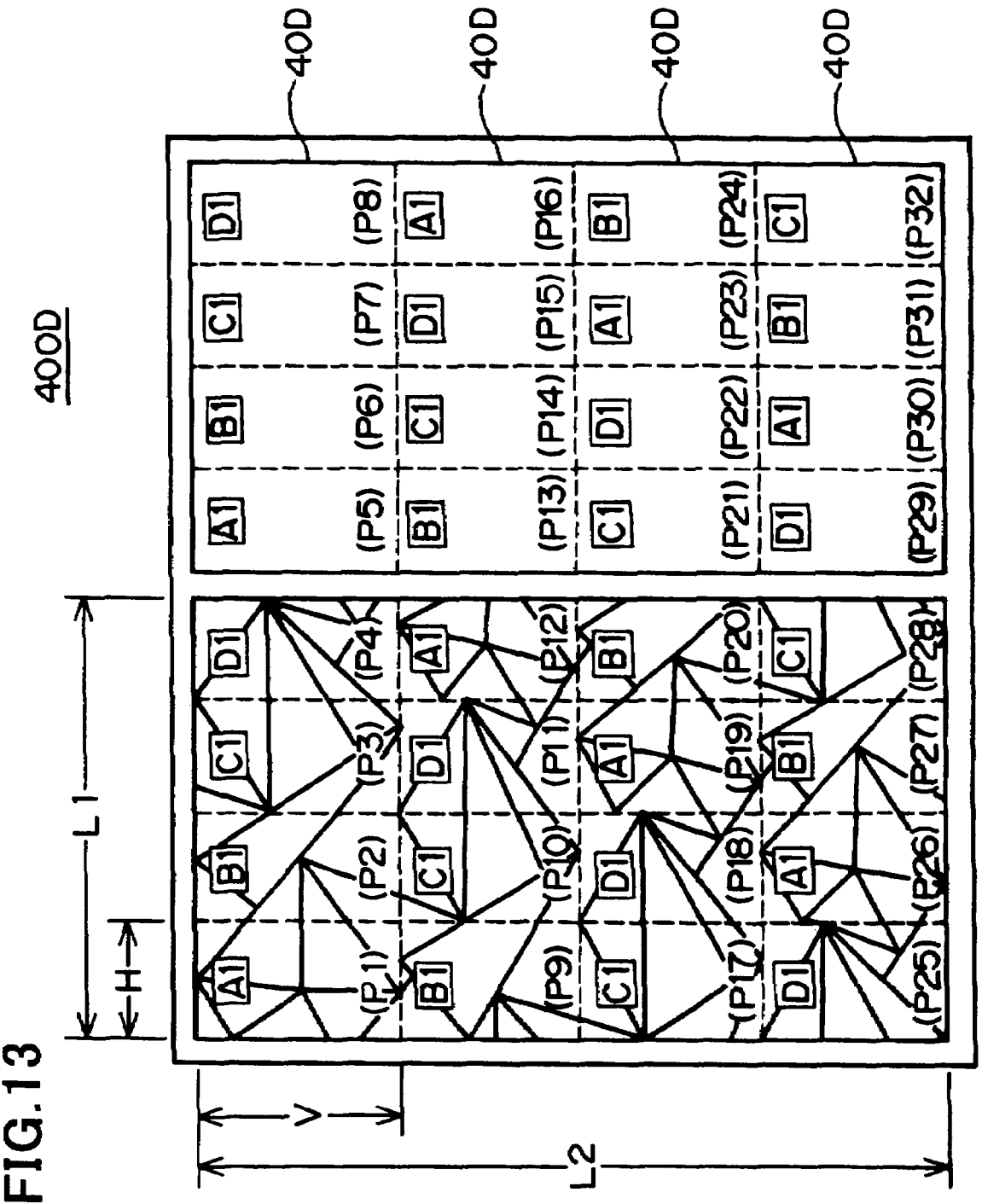
FIG. 13 is a plan view of a light-reflector and a light-reflection type liquid crystal display device including the light-reflector, in accordance with the fourth embodiment of the present invention.

FIG. 13 is a plan view of a light-reflector 40D and a light-reflection type liquid crystal display device 400D including the light-reflector 40D, in accordance with the fourth embodiment.

The light-reflection type liquid crystal display device 400D includes vertically four rows and horizontally eight rows of pixels. That is, the liquid crystal display device 400D includes totally thirty-two pixels each having a width H and a height V. Among the thirty-two pixels, pixels P1, P2, P3, P4, P5, P6, P7 and P8 are located at an uppermost row, pixels P9, P10, P11, P12, P13, P14, P15 and P16 are located at a second row immediately below the uppermost row, pixels P17, P18, P19, P20, P21, P22, P23 and P24 are located at a third row immediately below the second row, and pixels P25, P26, P27, P28, P29, P30, P31 and P32 are located at a lowermost row immediately below the third row. The light-reflection type liquid crystal display device 400D includes only light-reflection areas in each of which there is formed a light-reflector 40D.

Similarly to the light-reflector 40A in the first embodiment, the light-reflector 40D illustrated in FIG. 13 is formed at a surface thereof with a rugged pattern. Specifically, the rugged pattern is comprised of raised linear patterns extending in random directions, and recessed patterns surrounded by the raised linear patterns and defining a triangle are formed at a surface of the light-reflector 40D.

In light-reflector 40D, a first type rugged pattern A1 is formed in the pixel P1 located at the uppermost row, a second type rugged pattern B1 is formed in the pixel P2 located adjacent to the pixel P1, a third type rugged pattern C1 is formed in the pixel P3 located adjacent to the pixel P2, and a fourth type rugged pattern D1 is formed in the pixel P4 located adjacent to the pixel P3. In addition, these first to fourth type rugged patterns A1, B1, C1 and D1 are successively formed.

The first type rugged pattern A1 is formed in the pixel P5 located adjacent to the pixel P4, the second type rugged pattern B1 is formed in the pixel P6 located adjacent to the pixel P5, the third type rugged pattern C1 is formed in the pixel P7 located adjacent to the pixel P6, and the fourth type rugged pattern D1 is formed in the pixel P8 located adjacent to the pixel P7. In addition, these first to fourth type rugged patterns A1, B1, C1 and D1 are successively formed.

The second type rugged pattern B1 is formed in the pixel P9 located at the second row, the third type rugged pattern C1 is formed in the pixel P10 located adjacent to the pixel P9, the fourth type rugged pattern D1 is formed in the pixel P11 located adjacent to the pixel P10, and the first type rugged pattern A1 is formed in the pixel P12 located adjacent to the pixel P11. In addition, these second to first type rugged patterns B1, C1 D1 and A1 are successively formed.

The second type rugged pattern B1 is formed in the pixel P13 located adjacent to the pixel P12, the third type rugged pattern C1 is formed in the pixel P14 located adjacent to the pixel P13, the fourth type rugged pattern D1 is formed in the pixel P15 located adjacent to the pixel P14, and the first type rugged pattern A1 is formed in the pixel P16 located adjacent to the pixel P15. In addition, these second to first type rugged patterns 13, C1 D1 and A1 are successively formed.

The third type rugged pattern C1 is formed in the pixel P17 located at the third row, the fourth type rugged pattern D1 is formed in the pixel P18 located adjacent to the pixel P17, the first type rugged pattern A1 is formed in the pixel P19 located adjacent to the pixel P18, and the second type rugged pattern B1 is formed in the pixel P20 located adjacent to the pixel P19. In addition, these third to second type rugged patterns C1 D1 A1 and B1 are successively formed.

The third type rugged pattern C1 is formed in the pixel P21 located adjacent to the pixel P20, the fourth type rugged pattern D1 is formed in the pixel P22 located adjacent to the pixel P21, the first type rugged pattern A1 is formed in the pixel P23 located adjacent to the pixel P22, and the second type rugged pattern B1 is formed in the pixel P24 located adjacent to the pixel P23. In addition, these third to second type rugged patterns C1 D1 A1 and B1 are successively formed.

The fourth type rugged pattern D1 is formed in the pixel P25 located at the lowermost row, the first type rugged pattern A1 is formed in the pixel P26 located adjacent to the pixel P25, the second type rugged pattern B1 is formed in the pixel P27 located adjacent to the pixel P26, and the third type rugged pattern C1 is formed in the pixel P28 located adjacent to the pixel P27. In addition, these fourth to third type rugged patterns D1 A1 B1 and C1 are successively formed.

The fourth type rugged pattern D1 is formed in the pixel P29 located adjacent to the pixel P28, the first type rugged pattern A1 is formed in the pixel P30 located adjacent to the pixel P29, the second type rugged pattern B1 is formed in the pixel P31 located adjacent to the pixel P30, and the third type rugged pattern C1 is formed in the pixel P32 located adjacent to the pixel P31. In addition, these fourth to third type rugged patterns D1 A1 B1 and C1 are successively formed.

In the light-reflector 40D used in the light-reflection type liquid crystal display device 400D in accordance with the fourth embodiment, the same rugged pattern is repeatedly formed in the uppermost, second, third and lowermost rows every four pixels located in series. Specifically, the rugged pattern (A1+B1+C1+D1) is repeatedly formed in the uppermost row every four pixels located in series. Similarly, the rugged pattern (B1+C1+D1+A1) is repeatedly formed in the second row every four pixels located in series, the rugged pattern (C1+D1+A1+B1) is repeatedly formed in the third row every four pixels located in series, and the rugged pattern (D1+A1+B1+C1) is repeatedly formed in the lowermost row every four pixels located in series.

In addition, in a leftmost column of pixels, the first type rugged pattern A1, the second type rugged pattern B1, the third type rugged pattern C1 and the fourth type rugged pattern D1 are arranged in an order starting an uppermost one towards a lowermost one for the pixels P1, P9, P17 and P25, respectively.

In a second column of pixels located to the leftmost column of pixels, the second type rugged pattern B1, the third type rugged pattern C1, the fourth type rugged pattern D1 and the first type rugged pattern A1 are arranged in an order starting an uppermost one towards a lowermost one for the pixels P2, P10, P18 and P26, respectively.

In a third column of pixels located to the second column of pixels, the third type rugged pattern C1, the fourth type rugged pattern D1, the first type rugged pattern A1 and the second type rugged pattern B1 are arranged in an order starting an uppermost one towards a lowermost one for the pixels P3, P11, P19 and P27, respectively.

In a fourth column of pixels located to the third column of pixels, the fourth type rugged pattern D1, the first type rugged pattern A1, the second type rugged pattern B1 and the third type rugged pattern C1 are arranged in an order starting an uppermost one towards a lowermost one for the pixels P4, P12, P20 and P28, respectively.

Similarly, the rugged patterns are arranged in fifth to eighth columns of pixels in the same way as in the leftmost, second, third and fourth columns, respectively.

The first to fourth type rugged patterns A1 to D1 formed in the pixels P1, P9, P17 and P25, respectively, are successively formed. Similarly, the four type rugged patterns A1 to D1 formed in the pixels arranged vertically in the columns are successively formed.

In the light-reflector 40C in the third embodiment, the same rugged pattern is repeatedly formed only in a single direction, specifically, horizontally, every four pixels located in series. In contrast, in the light-reflector 40D in the fourth embodiment, the same rugged pattern (A1+B1+C1+D1), (B1+C1+D1+A1), (C1+D1+A1+B1) or (D1+A1+B1+C1) is repeatedly formed in two directions, specifically, both horizontally and vertically, every four pixels located in series.

In accordance with the above-mentioned light-reflectors 40A, 40B, 40C and 40D in the first to fourth embodiments, a rugged pattern is repeatedly formed over a plurality of pixels. Accordingly, unlike a conventional liquid crystal display device in which a rugged pattern is repeatedly formed in every pixel, it would be possible to set a greater and desired pitch of repetition of a rugged pattern. As a result, the light-reflectors 40A, 40B, 40C and 40D can prevent interference of reflected lights with each other, which could not be solved in the conventional light-reflector.

In the fourth embodiment, the rugged patterns A1, B1, C1 and D1 may be successively arranged horizontally, or may be successively arranged vertically. The successively formed pattern further prevent interference of reflected lights with each other. As an alternative, only the patterns A1 and B1 or C1 and D1 may be successively formed.

Though the same rugged pattern is repeatedly formed over two or four pixels in the above-mentioned light-reflectors 40A, 40B, 40C and 40D in the first to fourth embodiments, the same pattern may be repeatedly formed over three pixels, in which case, R (red), G (green) and B (blue) pixels may be selected as the three pixels.

However, when a rugged pattern is repeatedly formed ever RGB three pixels, a light-reflector has different reflectance for each of RGB, and hence, there might be generated a difference in chromaticity for RGB. Accordingly, it is preferable that a repetition cycle of a rugged pattern is set equal to N wherein N is an integer except three (3). That is, it is preferable that a rugged pattern is repeatedly formed every two, four, five or more pixels.

In the above-mentioned the light-reflectors 40A, 40B, 40C and 40D, the raised pattern is formed in a triangle. However, the raised pattern is not to be limited to a triangle, but may be formed in any shape unless the shape is closed. For instance, the raised pattern may be formed in a polygon or an ellipse.

The first embodiment relates to a half-light-transmission type liquid crystal display device and a light-reflector to be used therein, and the second to fourth embodiments relate to a light-reflection type liquid crystal display device and a light-reflector to be used therein. However, any one of the first to fourth embodiments may be applied to a half-light-transmission type liquid crystal display device and a light-reflector to be used therein, and a light-reflection type liquid crystal display device and a light-reflector to be used therein.

The inventors conducted the experiments as follows in order to determine an optimal pitch in horizontal repetition of a rugged pattern.

R, G and B pixels were horizontally formed in this order. There were formed first to fourth light-reflectors. The first light-reflector was formed at a surface thereof with a rugged pattern A, the second light-reflector was formed at a surface thereof with a rugged pattern A+B, the third light-reflector was formed at a surface thereof with a rugged pattern A+B+C, and the fourth light-reflector was formed at a surface thereof with a rugged pattern A+B+C+D. Then, a repetition cycle determined by a combination of the f, G, B pixels and the rugged patterns was defined as the number of pixels in a fundamental cycle, and a length of the fundamental cycle was defined as a total length of the rugged pattern.

The inventors evaluated each one of the combinations. The results of the evaluation is shown in Table 1.

TABLE 1

| CASE NO. | NO. OF RUGGED PATTERNS | HORIZONTAL LENGTH OF PIXEL | TOTAL LENGTH OF RUGGED PATTERNS | NO. OF PIXELS | INTERFERENCE EXISTS? | STRIPPED PATTERN EXISTS? | DIFFERENCE EXISTS IN CHROMATICITY? | CORRESPONDENCE |
|---|---|---|---|---|---|---|---|---|
| 1 | 1 | 80 | 240 | 3 | YES | NO | NO | RUGGED PATTERNS: A A A / RGB PIXELS: R G B |
| 2 | 2 | 80 | 480 | 6 | NO | NO | NO | RUGGED PATTERNS: A B A B A B / RGB PIXELS: R G B R G B |
| 3 | 3 | 80 | 240 | 3 | NO | YES | YES | RUGGED PATTERNS: A B C / RGB PIXELS: R G B |
| 4 | 4 | 80 | 960 | 12 | NO | YES | NO | RUGGED PATTERNS: A B C D A B C D A B C D / RGB PIXELS: R G B R G B R G B R G B |
| 5 | 1 | 60 | 160 | 3 | YES | NO | NO | RUGGED PATTERNS: A A A / RGB PIXELS: R G B |
| 6 | 2 | 60 | 360 | 6 | NO | NO | NO | RUGGED PATTERNS: A B A B A B / RGB PIXELS: R G B R G B |
| 7 | 3 | 60 | 180 | 3 | NO | NON-DETECTABLE | YES | RUGGED PATTERNS: A B C / RGB PIXELS: R G B |

In Table 1, case Nos. 1 and 5 show conventional ones.

In case No. 2, a horizontal length of a pixel is set equal to 80 micrometers, and the number of different rugged patterns is set equal to 2. Accordingly, a total length of the rugged patterns is equal to 480 micrometers, and the number of pixels in a fundamental cycle is equal to 6. In case No. 2, reflected lights did not interfere with one another. In Table 1, whether reflected lights interfered with one another is shown.

When pixels each having a light-reflector in which N pixels having N different colors from one another are repeatedly periodically arranged in a first direction wherein N is an integer equal to or greater than 2, and in which M rugged patterns different from one another are repeatedly formed every M pixels in the first direction wherein M is an integer equal to or greater than 2, are periodically and repeatedly formed, the pixels are differently watched by a viewer in dependence on a color and a rugged pattern. As a result, there is generated a stripped pattern which is differently seen by a viewer in the first direction at a cycle of a least common multiple (LCM) of N and M of pixels. That is, such a stripped pattern extends in a direction perpendicular to the first direction.

However, if a cycle is sufficiently short, a viewer cannot watch such a stripped pattern, that is, a viewer cannot recognize a stripped pattern. In the evaluation conducted by the inventors, since the first direction was defined as a horizontal direction, the above-mentioned stripped pattern was defined as a vertical pattern. In Table 1, whether such a stripped pattern was generated is shown.

In the evaluation, the number of pixels was set equal to three (3) in association with RGB pixels.

However, it should be noted that the first direction may be defined as a horizontal or oblique direction, and the number of pixels may be set equal to two, four or more.

As mentioned above, since reflectance is different for RGB pixels, there is generated a difference in chromaticity, if the number of different rugged patterns is equal to the number of RGB pixels, that is, three. In Table 1, whether a difference in chromaticity is generated, is also shown.

As a result of conducting the experiments for the seven cases Nos. 1 to 7, the following conclusions were obtained in view of Table 1.

(a) If the number of different rugged patterns is set equal to or greater than two (2), reflected lights do not interfere with each other.

(b) If a total length of rugged patterns is equal to or smaller than 0.5 mm, a viewer cannot recognize a vertical stripped pattern. If a total length of rugged patterns is over 0.5 mm, a viewer can recognize a vertical stripped pattern.

(c) If the number of different rugged patterns is equal to the number of RGB pixels, that is, three (3), there is generated a difference in chromaticity. If the number of different rugged patterns is equal to two, four or greater, a difference in chromaticity is not generated.

With respect to the light-reflectors 40A, 40B, 40C and 40D in the above-mentioned first to fourth embodiments, a horizontal pitch L1 of repetition of rugged patterns illustrated in FIGS. 10 to 13 or a vertical pitch L2 of repetition of rugged patterns illustrated in FIGS. 11 to 13 is preferably equal to about 0.5 mm or smaller.

By using the light-reflectors 40A, 40B, 40C and 40D in the above-mentioned first to fourth embodiments, as a light-reflector in a liquid crystal display device, it would be possible to solve a problem that reflected lights interfere with each other and there is generated a difference in chromaticity, which problem could not be solved in a conventional light-reflection type liquid crystal display device.

In order to suppress generation of a vertical stripped pattern, since pixels are different from one another with respect to a horizontal length, it is preferable that a horizontal total length of rugged patterns is set equal to or smaller than 0.5 mm.

When rugged patterns are horizontally formed, a vertical stripped pattern is generated, as mentioned above. In contrast, it is considered that when rugged patterns are vertically formed, a horizontal stripped pattern is generated. Hence, when rugged patterns are vertically formed, it is preferable that a vertical total length of rugged patterns is set equal to or smaller than 0.5 mm.

Hereinbelow is explained a method of fabricating a light-reflection type liquid crystal display device including one of the light-reflectors 40A, 40B, 40C and 40D in the above-mentioned first to fourth embodiments.

FIGS. 14A to 14D are cross-sectional views of a light-reflection type liquid crystal display device, illustrating respective steps of a process of fabricating the same.

Figure 14A:
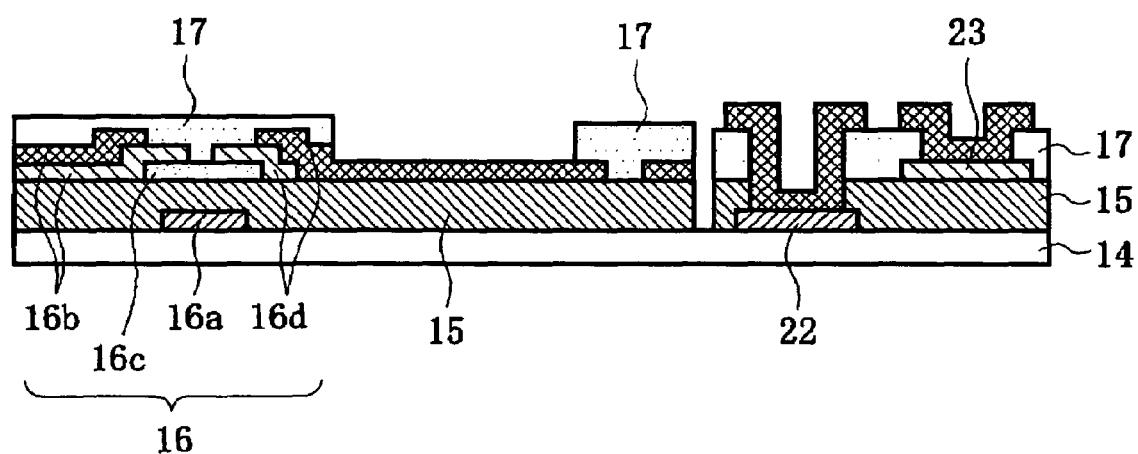
FIGS. 14A to 14D are cross-sectional views of a liquid crystal display device including the light-reflector in accordance with any one of the first to fourth embodiments, illustrating respective steps of a process of fabricating the same.

First, as illustrated in FIG. 14A, a thin film transistor (TFT) 16 is fabricated on an electrically insulating substrate 14 as a switching device.

Specifically, a gate electrode 16a is formed on the electrically insulating substrate 14, and then, an electrically insulating protection film 15 is formed on the electrically insulating substrate 14, covering the gate electrode 16a therewith. Then, on the electrically insulating protection film 15 are formed a drain electrode 16b, a semiconductor layer 16c and a source electrode 16d.

Then, a first electrically insulating layer 17 is formed over the thin film transistor 16.

Figure 14B:
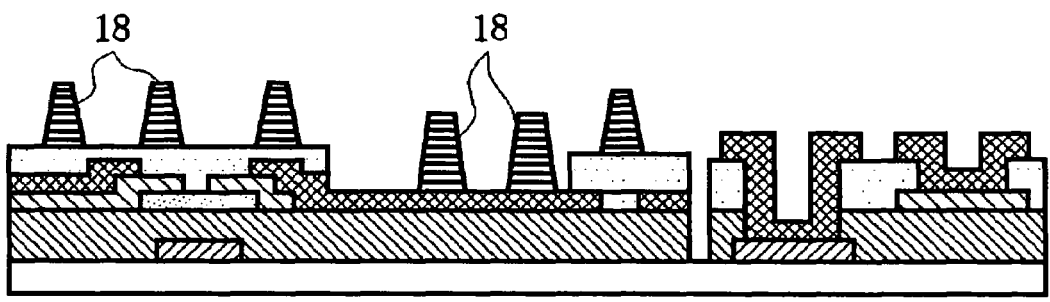

Then, photosensitive organic resin is coated over the first electrically insulating layer 17. Then, the resin is exposed to a light through a mask, and thereafter, is developed. As a result, a plurality of raised portions 18 are formed, as illustrated in FIG. 14B.

Figure 14C:
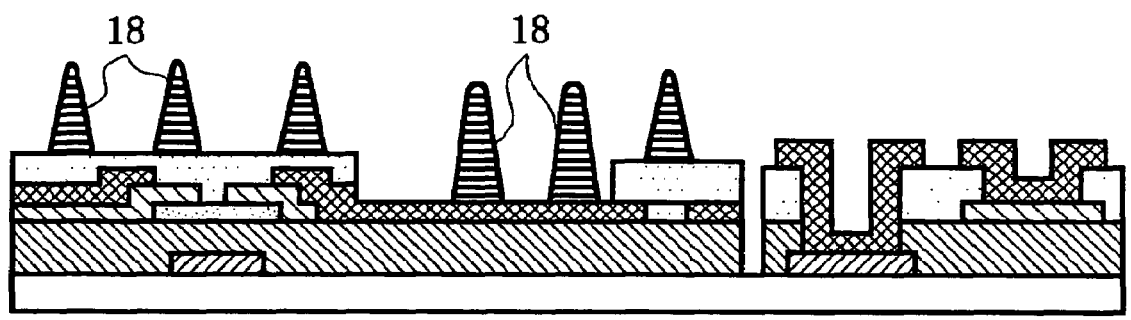

Then, as illustrated in FIG. 14C, the raised portions 18 composed of the organic resin are baked, resulting in that the raised portions 18 are rounded at theirs corners.

Then, an interlayer insulating film composed of organic resin is coated over the raised portions 18 such that the raised portions 18 are entirely covered with the interlayer insulating film, and that the interlayer insulating film has a smooth rugged surface. Then, a contact hole 21 is formed by photolithography and etching such that the contact hole 21 reaches the source electrode 16d.

Figure 14D:
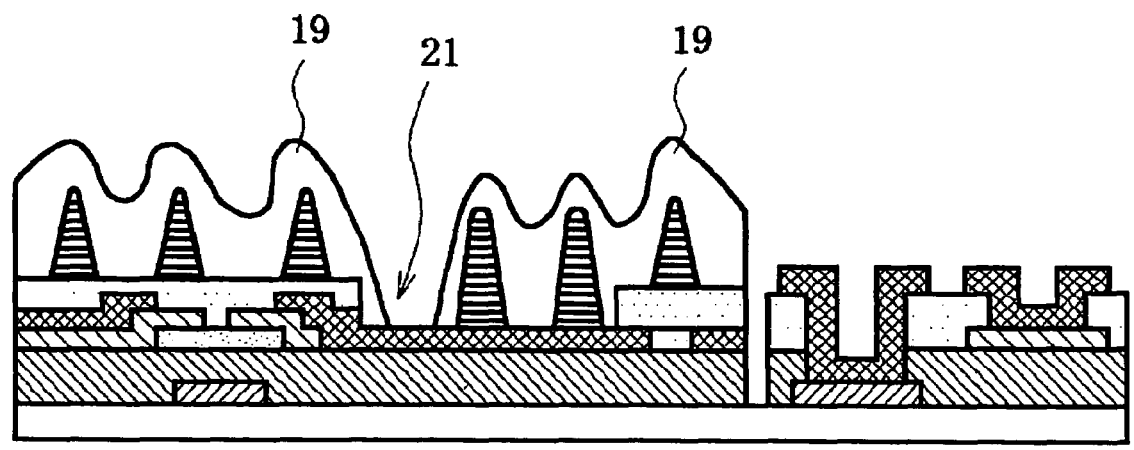

Then, as illustrated in FIG. 14D, the interlayer insulating film is baked to thereby turn the interlayer insulating film into a second electrically insulating film 19.

Figure 1:
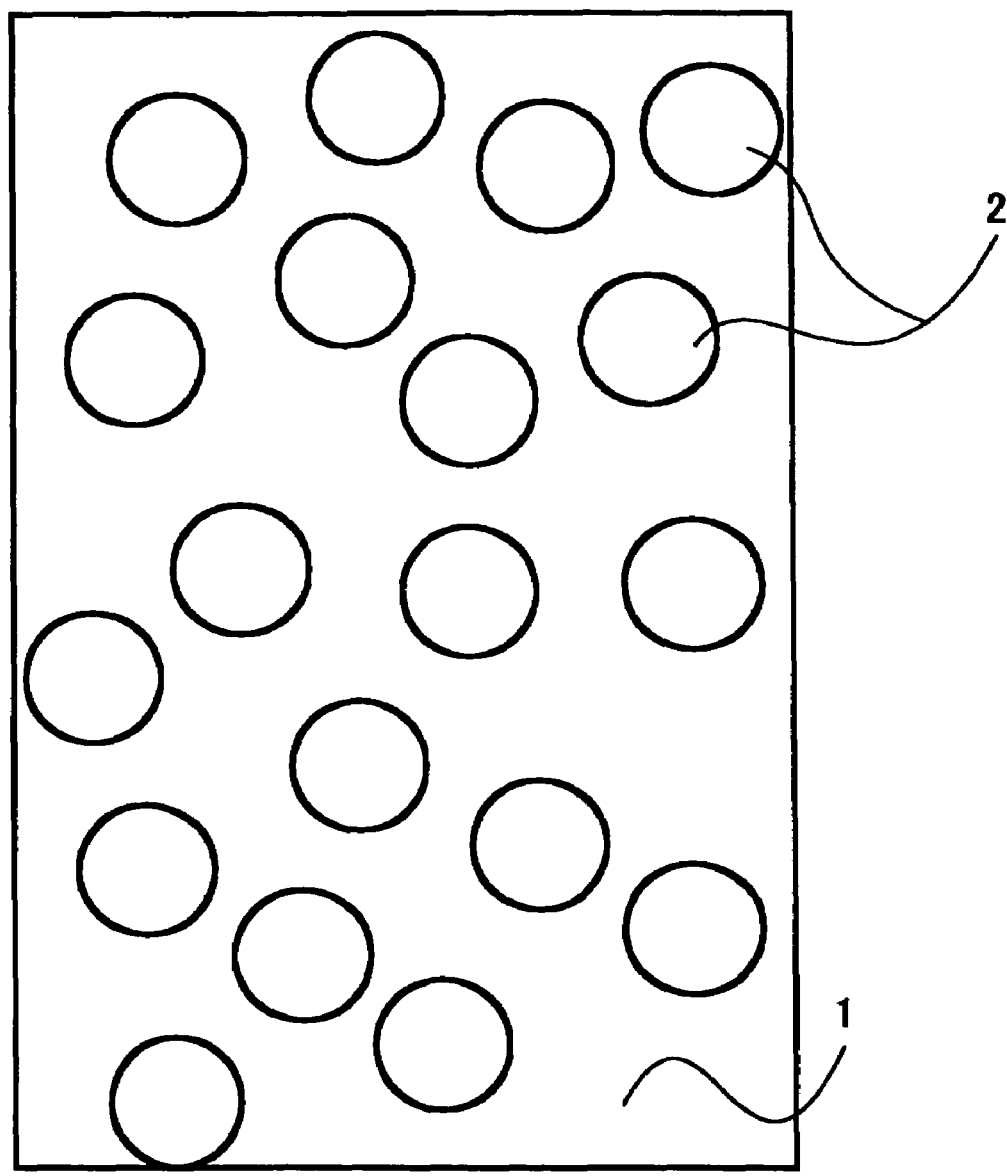
FIG. 1 is a plan view of an example of a rugged pattern formed at a surface of a conventional light-reflector.
Figure 2:
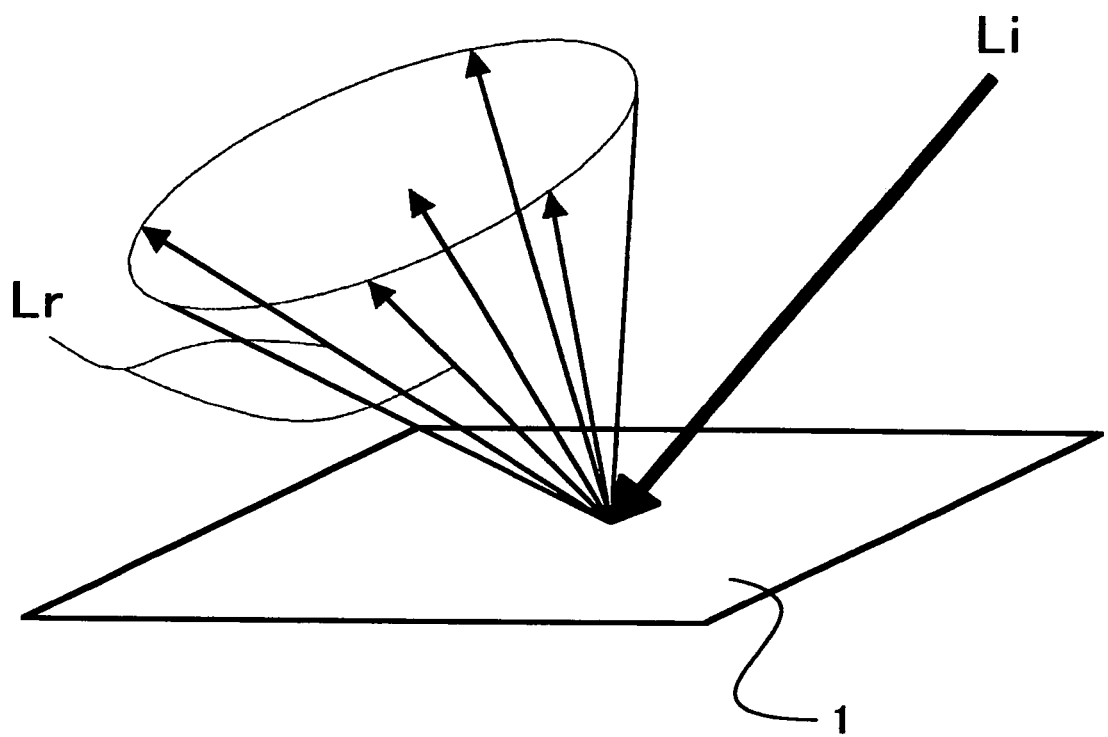
FIG. 2 is a perspective view illustrating a relation between an incident light Li and a light Lr reflected at the light-reflector illustrated in FIG. 1.
Figure 3:
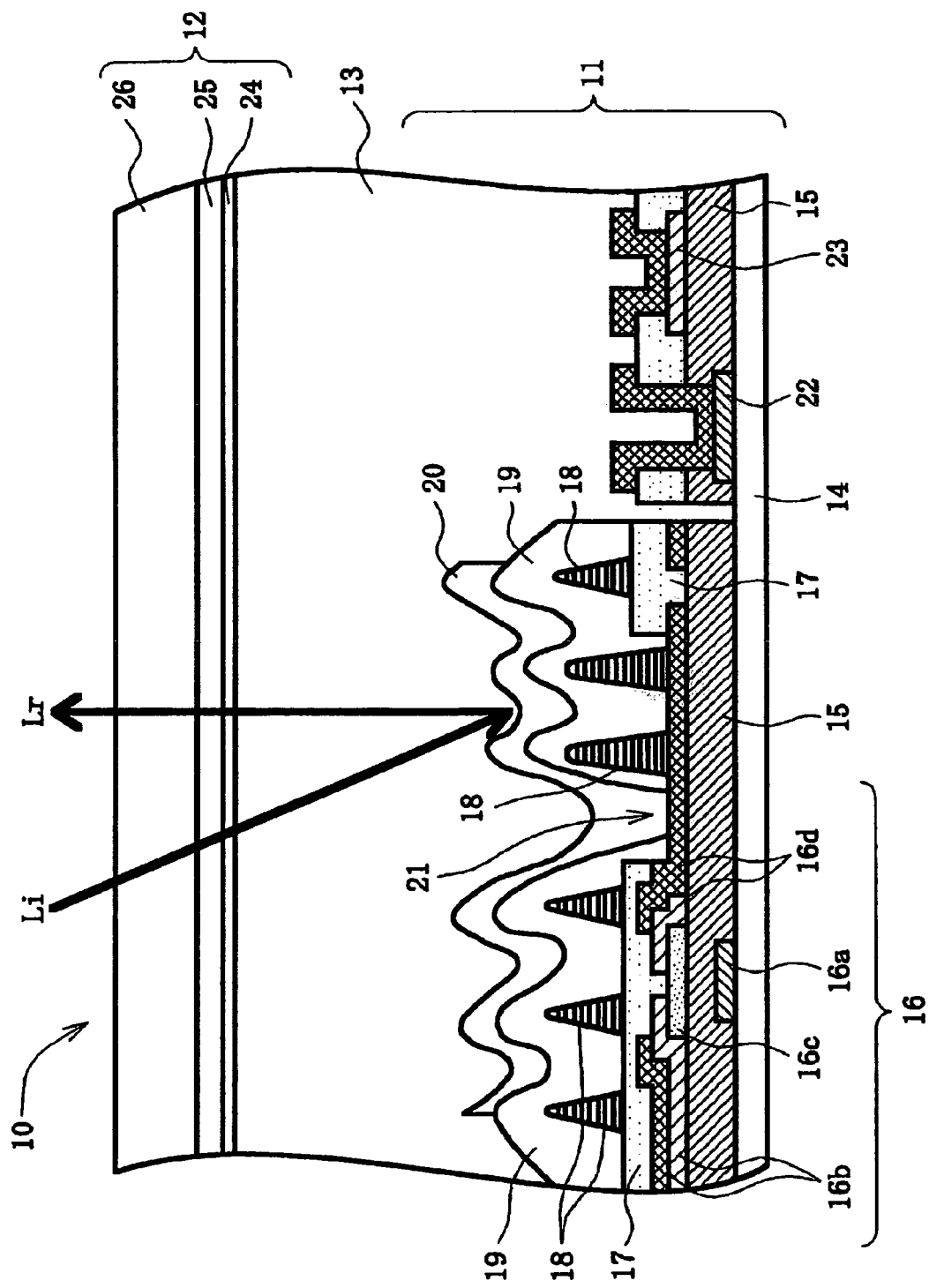
FIG. 3 is a partial cross-sectional view of a conventional light-reflection type liquid crystal display device.
Figure 4A:
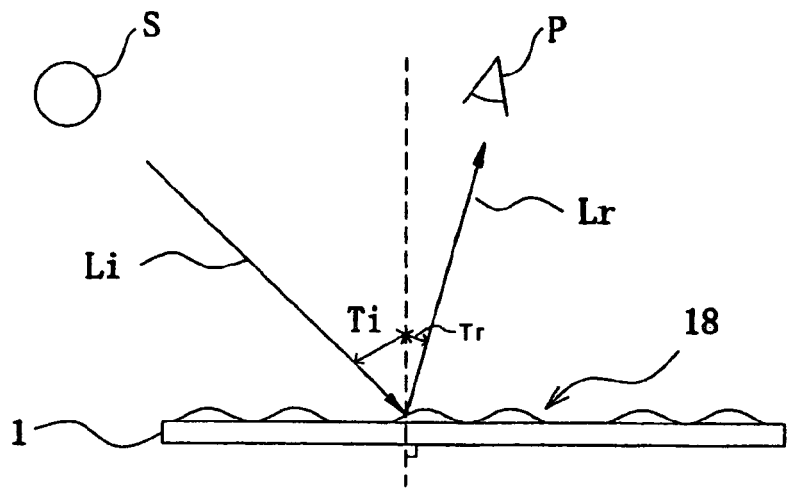
FIGS. 4A and 4B show a relation between an incident light and a reflected light.
Figure 4B:
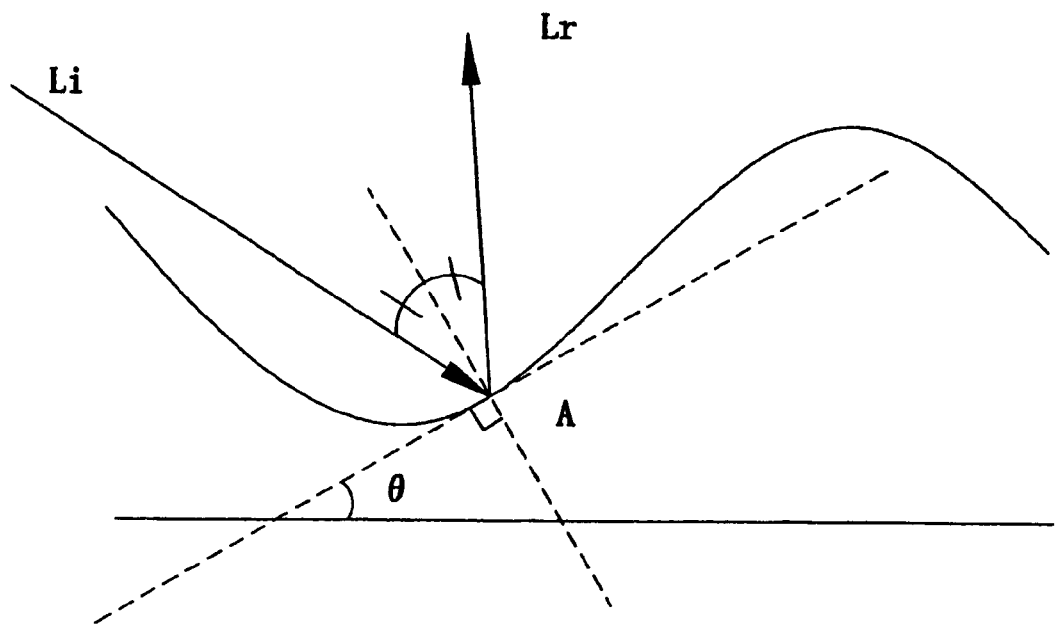
Figure 5A:
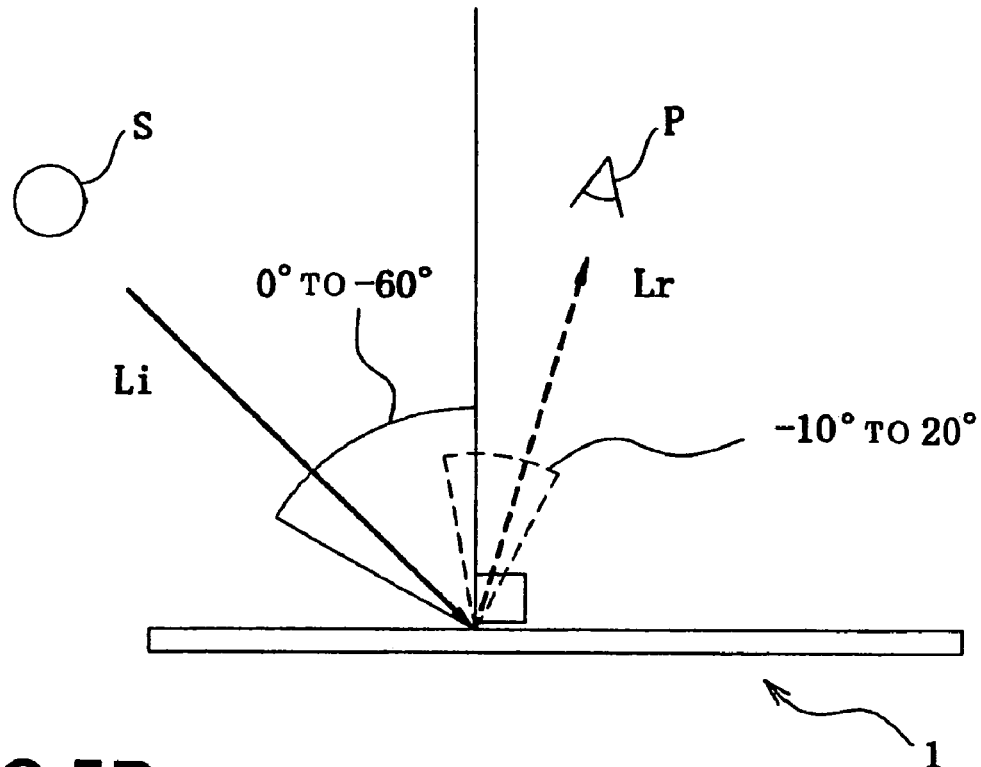
FIGS. 5A and 5B show a positional relation among a light source, a light-reflector and a viewer.
Figure 5B:
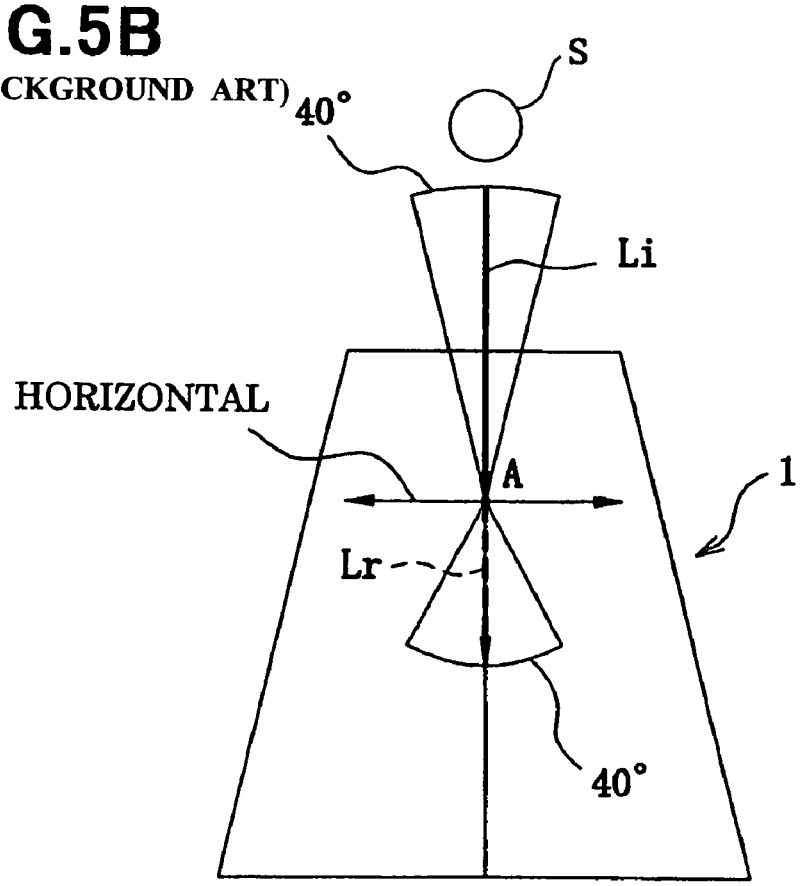

Then, a thin aluminum film is formed covering the contact hole 21 and the second electrically insulating film 19 therewith. Then, the thin aluminum film is processed by photolithography and etching. As a result, there is formed a reflection electrode (see FIG. 3) composed of aluminum.

The thus formed reflection electrode 20 has the same structure as that of the light-reflector 40A, 40B, 40C or 40D used in the half light-transmission type liquid crystal display device 400A, the light-reflection type liquid crystal display device 400B, 400C or 400D, illustrated in FIGS. 10 to 18, respectively.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-843533 filed on Nov. 8, 2001 including specification, claims, drawings and summary is incorporated herein by reference in its entirety.

What is claimed is:

1. A light-reflector for use in a liquid crystal display device which uses externally incident light as a light source by reflecting the externally incident light to a viewer and which includes a plurality of rows of pixels, each row including a plurality of pixels,
wherein each of the plurality of pixels comprises a plurality of pixel areas, the light reflector comprising a plurality of light reflector portions, said light reflector portions being formed in one of the plurality of pixel areas of each of said pixels,
wherein the light-reflector includes a plurality of thin film transistor switching devices each corresponding to one of the light reflector portions in the plurality of pixels,
wherein each light reflector portion is formed with a rugged pattern, including an alternating pattern of N pixel pattern areas, each pixel pattern area of the alternating pattern of N pixel pattern areas positioned to overlie a respective one pixel of said plurality of pixels of said plurality of rows of pixels of the liquid crystal display device, each of the N pixel pattern areas of the alternating pattern being different,
wherein each pixel pattern area of the alternating pattern is comprised of recessed and raised portions,
wherein said rugged pattern is repeated in every row of pixel areas, and
wherein N is an integer greater than one, other than three.

2. The light-reflector as set forth in claim 1, wherein a pitch of repetition of said rugged pattern is equal to or smaller than 0.5 mm.

3. The light-reflector as set forth in claim 1, wherein said raised portions are comprised of a plurality of linear shapes, and said recessed portions are surrounded by said raised portions to define closed shapes.

4. The light-reflector as set forth in claim 3, wherein said closed shapes include a triangle.

5. The light-reflector as set forth in claim 1, wherein N equals two.

6. The light-reflector as set forth in claim 1, wherein N equals four.

7. The light-reflector as set forth in claim 1, wherein each pixel of said plurality of pixels corresponds to only one of said plurality of pixel areas.

8. The light-reflector as set forth in claim 1, wherein each pixel area of said plurality of pixel areas corresponds to an entire area of each pixel of said plurality of pixels.

9. The light-reflector as set forth in claim 1, wherein said rugged pattern corresponds to a first pixel of said plurality of pixels, and said alternating pattern corresponds to a pixel other than said first pixel of said plurality of pixels.

10. The light-reflector as set forth in claim 1, wherein each of said pixel areas overlies less than an entirety of said corresponding plurality of pixels.

11. The light-reflector as set forth in claim 1, wherein said rugged pattern corresponds to a first pixel of said plurality of pixels.

12. A liquid crystal display device comprising a light-reflector, said liquid crystal display device using externally incident light as a light source by reflecting the externally incident light to a viewer and including a plurality of rows of pixels, each row including a plurality of pixels,
wherein each of the plurality of pixels comprises a plurality of pixel areas, the light reflector comprising a plurality of light reflector portions, said light reflector portions being formed in one of the plurality of pixel areas of each of said pixels,
wherein the light-reflector includes a plurality of thin film transistor switching devices each corresponding to one of the light reflector portions in the plurality of pixels,
wherein each light reflector portion is formed with a rugged pattern, including an alternating pattern of N pixel pattern areas, each pixel pattern area of the alternating pattern of N pixel pattern areas positioned to overlie a respective pixel of said plurality of pixels of said plurality of rows of pixels of the liquid crystal display device, each of the N pixel pattern areas of the alternating pattern being different,
wherein the alternating pattern is comprised of recessed and raised portions,
wherein said rugged pattern is repeated in every row of pixel areas, and
wherein N is an integer greater than one, other than three.

13. The liquid crystal display device as set forth in claim 12, wherein a pitch of repetition of said rugged pattern is equal to or smaller than 0.5 mm.

14. The liquid crystal display device as set forth in claim 12, wherein said raised portions are comprised of a plurality of linear shapes, and said recessed portions are surrounded by said raised portions to define closed shapes.

15. The liquid crystal display device as set forth in claim 14, wherein said closed shapes include a triangle.

16. The liquid crystal display device as set forth in claim 12, wherein N equals two.

17. The liquid crystal display device as set forth in claim 12, wherein N equals four.

18. A light-reflector for use in a liquid crystal display device which uses externally incident light as a light source by reflecting the externally incident light to a viewer and which includes a plurality of rows of pixels, each row including a plurality of pixels,
wherein each of the plurality of pixels comprises a plurality of pixel areas, the light reflector comprising a plurality of light reflector portions, said light reflector portions being formed in one of the plurality of pixel areas of each of said pixels,
wherein the light-reflector includes a plurality of thin film transistor switching devices each corresponding to one of the light reflector portions in the plurality of pixels,
wherein each light reflector portion is formed with a rugged pattern, including an alternating pattern of N pixel pattern areas, each pixel pattern area of the alternating pattern of N pixel pattern areas positioned to completely overlie a respective one pixel of said plurality of pixels of said plurality of rows of pixels of the liquid crystal display device, each of the N pixel pattern areas of the alternating pattern being different,
wherein each pixel pattern area of the alternating pattern is comprised of recessed and raised portions,
wherein said rugged pattern is repeated in every row of pixel areas, and
wherein N is an integer greater than one, other than three.

* * * * *